(12) United States Patent     (10) Patent No.:   US 12,636,798 B2

Komatsu     (45) Date of Patent:     May 26, 2026

---

(54) ROBOT, CEILING MOUNTED TYPE ROBOT AND ROBOT SYSTEM

(71) Applicant: SEIKO EPSON CORPORATION, Tokyo (JP)

(72) Inventor: Daisuke Komatsu, Suwa (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/888,286

(22) Filed: Sep. 18, 2024

(65) Prior Publication Data

US 2025/0091197 A1     Mar. 20, 2025

(30) Foreign Application Priority Data

Sep. 19, 2023    (JP) ................................. 2023-151741

(51) Int. Cl.
    *B25J 13/08*     (2006.01)
    *B25J 9/00*     (2006.01)
    *B25J 9/06*     (2006.01)

(52) U.S. Cl.
    CPC ........... *B25J 13/088* (2013.01); *B25J 9/0009* (2013.01); *B25J 9/06* (2013.01)

(58) Field of Classification Search
    CPC ................................. B25J 13/08; B25J 13/088
    See application file for complete search history.

(56) References Cited

U.S. PATENT DOCUMENTS

| | | | | |
|---|---|---|---|---|
| 8,855,823 B2 * | 10/2014 | Kirihara | ................. | G05B 15/02 |
| | | | | 700/258 |
| 2005/0246061 A1 | 11/2005 | Oaki et al. | | |
| 2012/0215357 A1 | 8/2012 | Igarashi et al. | | |
| 2013/0145893 A1 | 6/2013 | Kumagai et al. | | |
| 2015/0321357 A1 * | 11/2015 | Igarashi | ................. | B25J 9/1641 |
| | | | | 901/46 |
| 2015/0321361 A1 | 11/2015 | Hahakura et al. | | |
| 2016/0221182 A1 | 8/2016 | Hahakura et al. | | |
| 2018/0207797 A1 * | 7/2018 | Yamaoka | ................. | B25J 9/163 |

(Continued)

FOREIGN PATENT DOCUMENTS

| | | | | | |
|---|---|---|---|---|---|
| CN | 105835079 A | * | 8/2016 | ............. | B25J 13/08 |
| CN | 108015754 A | * | 5/2018 | ............. | B25J 9/126 |

(Continued)

*Primary Examiner* — Bobby Rushing, Jr.

(74) *Attorney, Agent, or Firm* — Harness, Dickey & Pierce, P.L.C.

(57) ABSTRACT

A robot includes a base section that is installed on an installation surface; a first arm that is connected to the base section so as to be pivotable about a first pivot axis with respect to the base section; a second arm that is connected to the first arm so as to be pivotable about a second pivot axis parallel to the first pivot axis with respect to the first arm; a shaft that is connected to the second arm so as to be pivotable about a third pivot axis parallel to the first pivot axis with respect to the second arm and so as to be movable along an axial direction of the third pivot axis, and that includes an end section on a first arm side; and a vibration detection section that is provided on the base section, wherein a length of the shaft from the second arm to the end section of the shaft is shorter than a distance along the axial direction of the third pivot axis between the second arm and the first arm.

7 Claims, 5 Drawing Sheets

(56)          References Cited

U.S. PATENT DOCUMENTS

| | | | |
|---|---|---|---|
| 2018/0281184 A1* | 10/2018 | Kudo | B25J 13/088 |
| 2019/0389077 A1 | 12/2019 | Hoshino et al. | |
| 2022/0063090 A1 | 3/2022 | Seki | |
| 2023/0166395 A1* | 6/2023 | Imai | B25J 9/104 |
| | | | 74/490.01 |
| 2024/0051118 A1 | 2/2024 | Geng et al. | |
| 2024/0058945 A1 | 2/2024 | Tanaka | |

FOREIGN PATENT DOCUMENTS

| | | | |
|---|---|---|---|
| JP | H10-100085 A | 4/1998 |
| JP | 2005-242794 A | 9/2005 |
| JP | 2008-213130 A | 9/2008 |
| JP | 2012-171052 A | 9/2012 |
| JP | 2015-211999 A | 11/2015 |
| JP | 2016-140921 A | 8/2016 |
| JP | 2020-001108 A | 1/2020 |
| JP | 2022-039291 A | 3/2022 |
| WO | 2012-029174 A1 | 3/2012 |
| WO | 2022/097649 A1 | 5/2022 |
| WO | 2022/163489 A1 | 8/2022 |

* cited by examiner

ROBOT, CEILING MOUNTED TYPE ROBOT AND ROBOT SYSTEM

The present application is based on, and claims priority from JP Application Serial Number 2023-151741, filed Sep. 19, 2023, the disclosure of which is hereby incorporated by reference herein in its entirety.

BACKGROUND

1. Technical Field

The present disclosure relates to a robot and a robot system.

2. Related Art

As one industrial robot, for example, a ceiling mounted type SCARA robot is known that is suspended and installed on a ceiling surface as described in WO 2012/029174.

The ceiling mounted type SCARA robot described in WO 2012/029174 includes a base (base section) fixed to a ceiling, a first arm connected to the base and pivotable within a horizontal plane, a second arm connected to the first arm and pivotable within a horizontal plane, and an actuation shaft provided at a tip end of the second arm, to which is attached a tool for transporting a workpiece (component) or the like. A motor and a decelerator for driving the actuation shaft are fixed to the second arm. The first arm and the second arm constitute a robot arm.

In such a ceiling mounted type SCARA robot, an acceleration sensor as a vibration detection device is installed at a tip end section of the robot arm, and vibration control for suppressing vibration of the robot is performed on the basis of a detection value detected by the acceleration sensor.

The ceiling mounted type SCARA robot described in WO 2012/029174 is installed on a ceiling of a platform, so in order to accurately detect vibration of the robot and vibration of the platform, it is necessary to install a vibration detection device in an appropriate location. However, in the related art, sufficient thought was not given to a installation position of the vibration detection device, resulting in insufficient vibration detection accuracy.

SUMMARY

A robot of the present disclosure includes a base section that is installed on an installation surface; a first arm that is connected to the base section so as to be pivotable with respect to the base section about a first pivot axis; a second arm that is connected to the first arm so as to be pivotable with respect to the first arm about a second pivot axis parallel to the first pivot axis; a shaft that is connected to the second arm so as to be pivotable with respect to the second arm about a third pivot axis parallel to the first pivot axis and so as to be movable along an axial direction of the third pivot axis, and that includes an end section on a first arm side; and a vibration detection section that is provided on the base section, wherein a length of the shaft from the second arm to the end section of the shaft is shorter than a distance along the axial direction of the third pivot axis between the second arm and the first arm.

A robot system of the present disclosure includes a base section that is installed on an installation surface; a first arm that is connected to the base section so as to be pivotable with respect to the base section about a first pivot axis; a second arm that is connected to the first arm so as to be pivotable with respect to the first arm about a second pivot axis parallel to the first pivot axis; a shaft that is connected to the second arm so as to be pivotable with respect to the second arm about a third pivot axis parallel to the first pivot axis and so as to be movable along an axial direction of the third pivot axis, and that includes an end section on a first arm side; a vibration detection section that is provided on the base section; and a control section that controls driving of at least one of the first arm, the second arm, and the shaft based on a detection value of the vibration detection section, wherein a length of the shaft from the second arm to the end section of the shaft is shorter than a distance along the axial direction of the third pivot axis between the second arm and the first arm.

DESCRIPTION OF EMBODIMENTS

Hereinafter, a robot and a robot system according to the present disclosure will be described in detail based on preferred embodiments shown in the accompanying drawings.

First Embodiment

Figure 1:
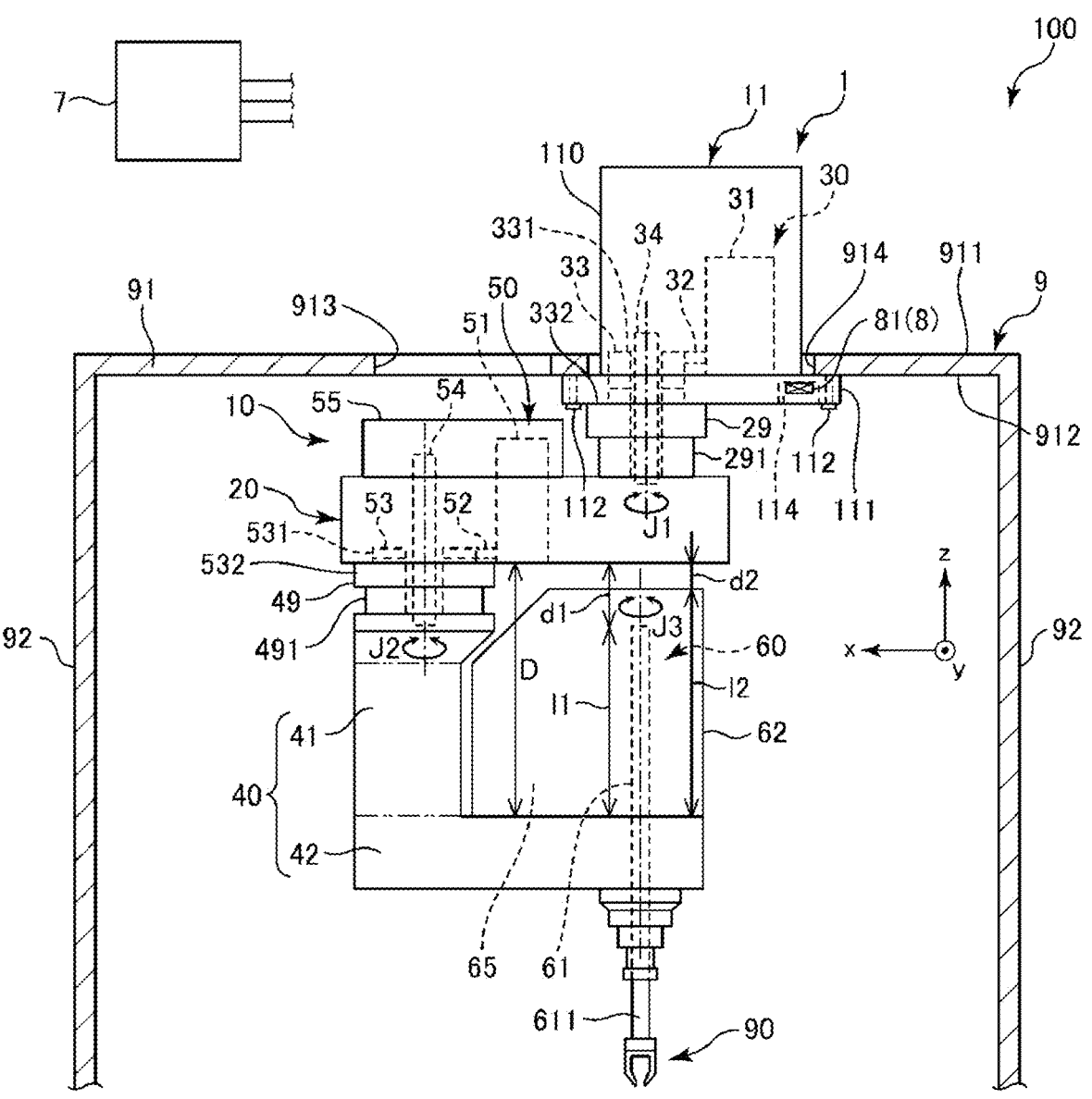
FIG. 1 is a side view of a robot and a robot system according to a first embodiment of the present disclosure.
Figure 2:
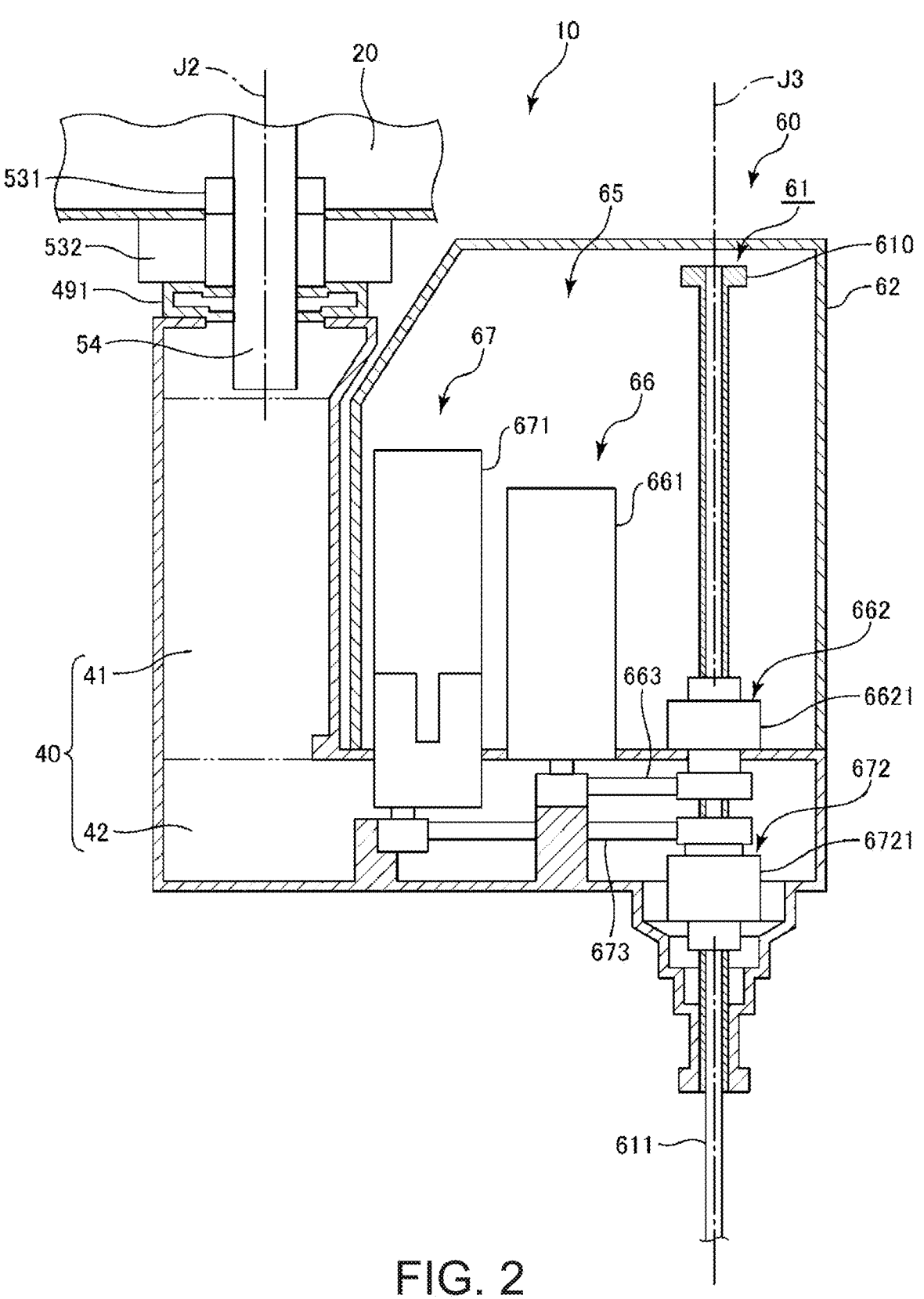
FIG. 2 is a partially enlarged cross-sectional view of the robot shown in FIG. 1.
Figure 3:
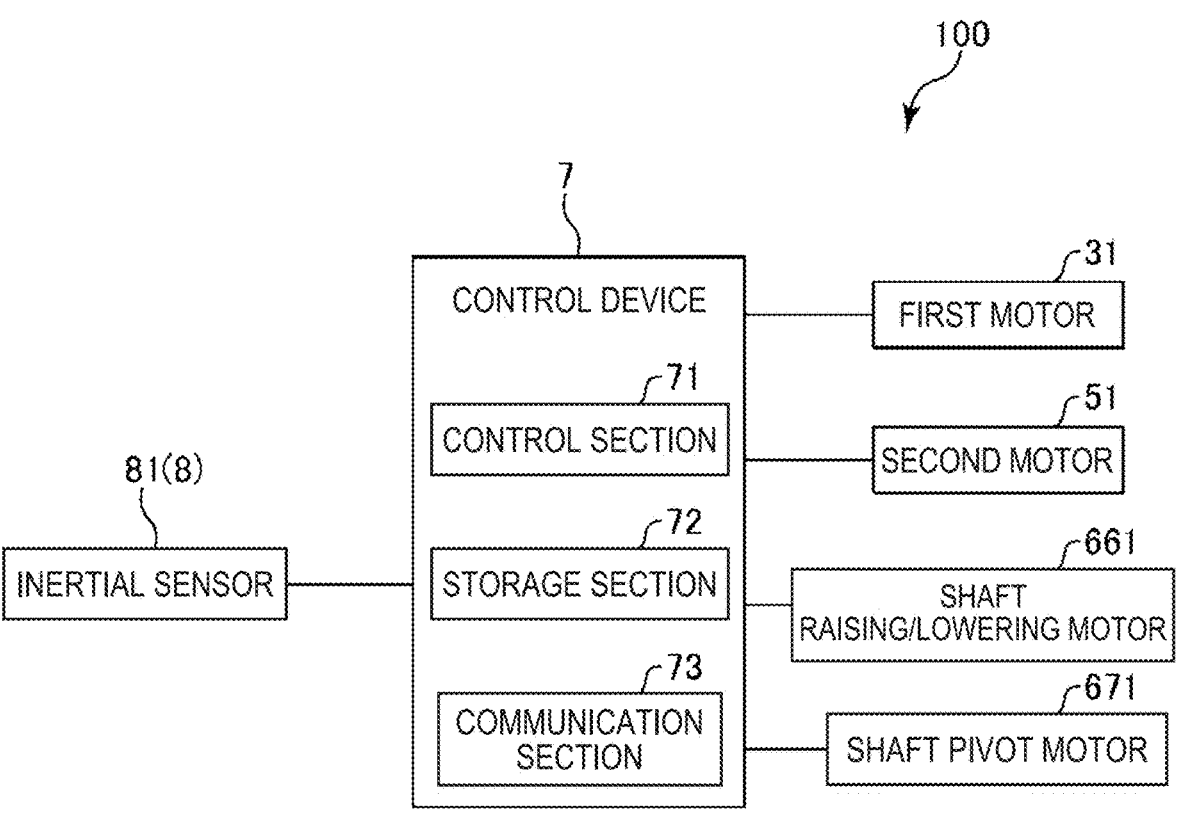
FIG. 3 is a block diagram of the robot system shown in FIG. 1.
Figure 4:
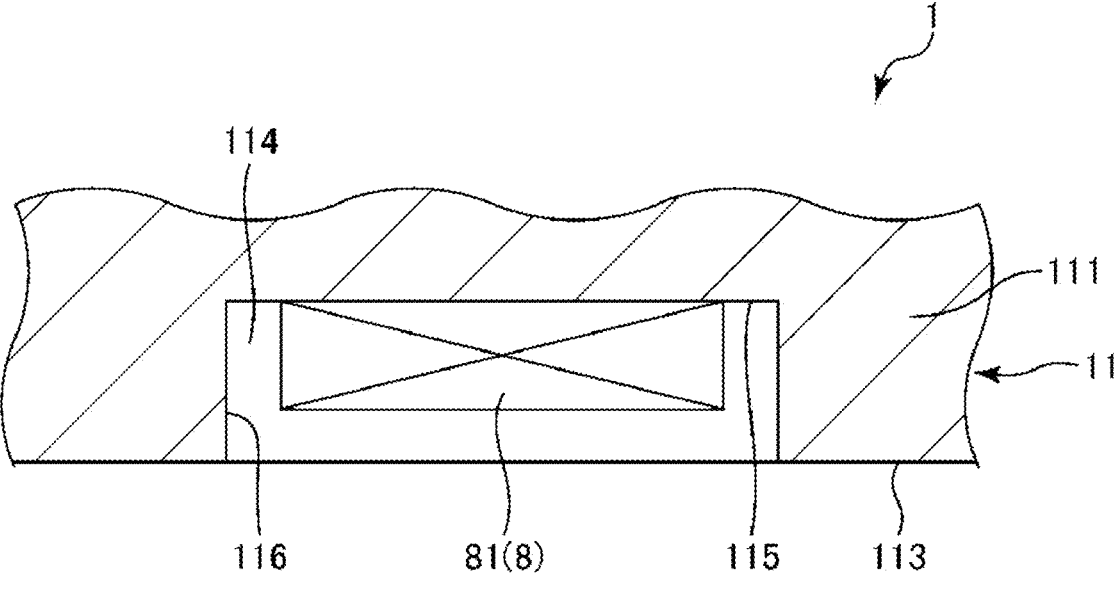
FIG. 4 is an enlarged cross-sectional view of a base section and a vibration detection section shown in FIG. 1.

FIG. 1 is a side view of a robot and a robot system according to a first embodiment of the present disclosure. FIG. 2 is a partially enlarged cross-sectional view of the robot shown in FIG. 1. FIG. 3 is a block diagram of the robot system shown in FIG. 1. FIG. 4 is an enlarged cross-sectional view of a base section and a vibration detection section shown in FIG. 1.

Hereinafter, for convenience of description, an upper side, a lower side, a left side, and a right side in FIGS. 1 and 2 are referred to as "upper", "lower", "left", and "right", respectively. In FIGS. 1 and 2, an upper-lower direction is referred to as a "vertical direction", and a left-right direction is referred to as a "horizontal direction".

As shown in FIG. 1, a robot system 100 includes a robot 1 and a control device 7 that controls the robot 1.

The robot 1 shown in FIG. 1 is a horizontal articulated robot installed to suspend from a ceiling, and is a so-called ceiling mounted type SCARA robot. In FIG. 1, a basic posture of the robot 1 is shown.

For example, the robot 1 is used in a manufacturing step or the like of manufacturing a precision device such as a mobile phone, a smartphone, or a tablet device, and can perform gripping, transporting, processing, assembling, or the like of a precision device, a component, or the like.

In the present embodiment, the robot 1 is installed by being suspended from a top plate 91 serving as a ceiling positioned above a platform 9 including frame-shaped leg sections 92. The top plate 91 is installed horizontally and includes an upper surface 911 and a lower surface 912. At least one of the surfaces of the top plate 91 serves as an installation surface on which the robot 1 is installed. In the present embodiment, the lower surface 912 is an installation surface of the robot 1.

The top plate 91 includes through holes 913 and 914 that penetrate in the thickness direction thereof. The through holes 913 and 914 are arranged apart from each other in this order from the left side in FIG. 1. The through hole 913 is a window for a worker to access from above the top plate 91 when performing maintenance of a second motor unit 50 (to be described later) or the like. The through hole 914 is a hole for installing a base section 11 on the top plate 91, and the base section 11 is inserted through the through hole 914.

As shown in FIG. 1, the robot 1 includes the base section 11 and a robot arm 10 connected to the base section 11. The robot arm 10 includes a first arm 20 that is driven to pivot with respect to the base section 11, a second arm 40 that is driven to pivot with respect to the first arm 20, and a work head 60, and the pivot drive of the first arm 20 and the second arm 40 is controlled by a control device 7 (to described later).

Hereinafter, each section constituting the robot 1 will be described in detail.

As shown in FIG. 1, the base section 11 is a member that is positioned at the uppermost position of the robot 1 and is attached to the top plate 91 of the platform 9. The base section 11 includes a main body section 110 and a plate-shaped flange section 111, which is provided on a lower section of the main body section 110. The main body section 110 is installed by being inserted into the through hole 914 and is constituted by a housing. The flange section 111 functions as an attachment section for attaching the base section 11 to the lower surface 912 by being fixed to the lower surface 912 via fixing members 112 such as a bolt, a screw, or a pin. A fixing method of the base section 11 to the lower surface 912 is not limited to a method of fixing by the fixing member 112 as described above, and may be any method such as a method of fixing by adhesion.

In the shown configuration, the base section 11 is attached to the lower surface 912 by the flange section 111, however, the present disclosure is not limited thereto, and for example, an upper section of the base section 11 may be attached to the lower surface 912.

The base section 11 may be attached to the upper surface 911 of the top plate 91. In this case, the upper surface 911 is an installation surface of the robot 1. In a case where the base section 11 is attached to the upper surface 911 of the top plate 91, for example, a lower surface of the flange section 111 may be fixed to the upper surface 911, and a first joint section 29 (to described later) may be inserted through the through hole 914.

Robot Arm

As shown in FIG. 1, the robot arm 10 includes the first arm 20 extending in the horizontal direction, a first motor unit 30 partially provided in the base section 11 and driving the first arm 20 to pivot, the second arm 40 provided below the first arm 20 and having an L-shape in side view, and a second motor unit 50 partially provided in the first arm 20 and driving the second arm 40 to pivot.

The first joint section 29 is provided at one end section of the first arm 20, that is, an end section on a right side in FIG. 1, and the first arm 20 is supported in a cantilever manner by the base section 11 via the first joint section 29. The first joint section 29 is a connection section that pivotably connects the first arm 20 to the base section 11. The first joint section 29 includes a part of a decelerator 33 (to be described later), a shaft 34, and a hollow plate 291. By this, the first arm 20 is connected to the base section 11 so as to be pivotable about a first pivot axis J1 extending along the vertical direction.

The first motor unit 30 includes a first motor 31 as a first drive source, a belt 32, the decelerator 33, and the shaft 34. Since at least a part of the first motor unit 30 is accommodated in the main body section 110, entry of foreign matter such as dust and dirt into the first motor unit 30 and discharge of foreign matter from the first motor unit 30 to the outside of the robot arm 10 are prevented. The first motor 31 and the belt 32 are accommodated in the main body section 110 of the base section 11. In the present embodiment, a pulley 331 and a part of an input shaft of the decelerator main body 332 of the decelerator 33 are provided in the main body section 110 of the base section 11, and the remaining part of the input shaft of the decelerator main body 332, a deceleration section, and an output shaft are provided outside the main body section 110 of the base section 11. All of the decelerator 33 may be provided in the main body section 110 of the base section 11.

The decelerator 33 is a hollow decelerator and includes the pulley 331 around which the belt 32 is wound and the decelerator main body 332. The decelerator main body 332 includes an input shaft connected to the pulley 331, a deceleration section that reduces the pivot force of the input shaft, and an output shaft that outputs the pivot force after deceleration. A pivot axes of the input shaft and the output shaft of the decelerator main body 332 are arranged coaxially. In the present embodiment, the decelerator main body 332 is a wave gear decelerator. The output shaft of the decelerator main body 332 is fixed to the plate 291.

The shaft 34 is arranged in a hollow central section of the decelerator 33 and the plate 291. The shaft 34 is hollow, extends along the vertical direction, and includes a lower end section fixed to the first arm 20. Wiring, piping, and the like (not shown) are routed between the base section 11 and the first arm 20 through the hollow shaft 34. The plate 291 connects the decelerator main body 332 and the first arm 20. In the present embodiment, the periphery of the shaft 34 of the plate 291 is recessed, and a bearing that supports the input shaft of the decelerator main body 332 is arranged in the recess. The output shaft of the decelerator main body 332 and the first arm 20 are fixed to a portion of the plate 291 that is more in the outer diameter than the recess. In the first motor unit 30, the pivot driving force of the first motor 31 is transmitted to the decelerator 33 via the belt 32, is decelerated by the decelerator 33, the plate 291 is pivoted by the increased pivot force, and the first arm 20 is pivoted by the pivot of the plate 291. In the present embodiment, the shaft 34 is arranged on the decelerator 33 and the plate 291, but the present disclosure is not limited to this, and a structure in which the shaft 34 is not arranged on the decelerator 33 and the plate 291 may be adopted. In this case, the decelerator 33 and the plate 291 may not be hollow, and wiring, piping, and the like may be routed to the outside.

A second joint section 49 is provided at an upper end section of the second arm 40, and the second arm 40 is connected to the other end section of the first arm 20, that is, an end section on the left side in FIG. 1, via the second joint section 49. The second joint section 49 includes a part of a decelerator 53 (to be described later), a shaft 54, and a hollow plate 491. The second arm 40 includes a first member 41 extending in the vertical direction downward from the second joint section 49 and a second member 42 extending in the horizontal direction from a lower end section of the first member 41. The first member 41 is also referred to as a columnar section, the second member 42 is also referred to as an arm base.

The first member 41 and the second member 42 are integrally formed or formed by fixing separate members together. The second joint section 49 includes a mechanism for pivotably supporting the second arm 40 with respect to the first arm 20. By this, the second arm 40 is pivotable with respect to the first arm 20 about a second pivot axis J2 extending along the vertical direction.

The second pivot axis J2 and the first pivot axis J1 are spaced apart by a predetermined distance, for example, a distance of 50 mm or more and 900 mm or less, in the horizontal direction.

The second motor unit 50 is provided in the first arm 20, and includes a second motor 51 as a second drive source, a belt 52, a decelerator 53, and a shaft 54. Since at least a part of the second motor unit 50 is accommodated in the first arm 20, entry of foreign matter such as dust and dirt into the second motor unit 50 and discharge of foreign matter from the second motor unit 50 to the outside of the robot arm 10 are prevented. The second motor 51 and the belt 52 are accommodated in the first arm 20. In the present embodiment, a pulley 531 and a part of an input shaft of the decelerator main body 532 of the decelerator 53 are provided in the first arm 20, and the remaining part of the input shaft of the decelerator main body 532, a deceleration section, and an output shaft are provided outside the first arm 20. All of the decelerator 53 may be provided in the first arm 20.

The decelerator 53 is a hollow decelerator, and includes the pulley 531 around which the belt 52 is wound and the decelerator main body 532. The decelerator main body 532 includes an input shaft connected to the pulley 531, a deceleration section that reduces the pivot force of the input shaft, and an output shaft that outputs the pivot force after the deceleration. Pivot axes of the input shaft and the output shaft of the decelerator main body 532 are arranged coaxially. In the present embodiment, the decelerator main body 532 is a wave gear decelerator. The output shaft of the decelerator main body 532 is fixed to the plate 491. The shaft 54 is arranged in a hollow central section of the decelerator 53 and the plate 491. The shaft 54 is hollow, extends along the vertical direction, and includes a lower end section fixed to the second arm 40. Wiring, piping, and the like (not shown) are routed between the first arm 20 and the second arm 40 through the hollow shaft 54. The plate 491 connects the decelerator main body 532 and the second arm 40. In the present embodiment, the periphery of the shaft 54 of the plate 491 is recessed, and a bearing that supports the input shaft of the decelerator main body 532 is arranged in the recess. The output shaft of the decelerator main body 532 and the second arm 40 are fixed to a portion of the plate 491 that is more outer diameter than the recess.

An upper portion of the second motor unit 50 is covered by a cover member 55 provided on the first arm 20. This prevents foreign matter such as dust and dirt from entering the second motor unit 50.

In the second motor unit 50, the driving force of the second motor 51 is transmitted to the decelerator 53 via the belt 52, is decelerated by the decelerator 53, the plate 491 is pivoted by the increased pivot force, and the second arm 40 is pivoted by the pivot of the plate 491. In the present embodiment, the shaft 54 is arranged on the decelerator 53 and the plate 491, but the present disclosure is not limited to this, and a structure in which the shaft 54 is not arranged on the decelerator 53 and the plate 491 may be adopted. In this case, the decelerator 53 and the plate 491 may not be hollow, and wiring, piping, and the like may be routed to the outside.

In the robot arm 10 including such a configuration, the first pivot axis J1 of the first arm 20 and the second pivot axis J2 of the second arm 40 are parallel to each other, but are shifted from each other in the horizontal direction. That is, the first pivot axis J1 and the second pivot axis J2 are spaced apart from each other by a predetermined distance in the horizontal direction. Therefore, the movable range of the robot arm 10 can be widened.

Work Head

As shown in FIGS. 1 and 2, the work head 60 includes an actuation shaft 61 which is a shaft provided at a tip end section of the second arm 40, and a drive section 65 provided between the actuation shaft 61 and the first member 41 on the second member 42. A part of the actuation shaft 61 and the drive section 65 is covered by a cover member 62 provided on the second member 42 of the second arm 40, preventing entry of foreign matter such as dust and dirt. The cover member 62 is detachable from the second member 42, but may be fixed to the second member 42.

The actuation shaft 61 is provided along a third pivot axis J3 extending in the vertical direction, the actuation shaft 61 is able to move along the third pivot axis J3 and pivot about the third pivot axis J3, and movement and pivot drive along the third pivot axis J3 of the actuation shaft 61 is controlled by a control device 7 (to be described later). The actuation shaft 61 includes an upper end section 610, which is an end section on a first arm 20 side, and a lower end section 611, which is an end section on a side opposite to the first arm 20. The lower end section 611 of the actuation shaft 61 protrudes downward from the second arm 40. As shown in FIG. 1, an end effector such as a hand 90 for gripping a precision device, a component, or the like is detachably attached to the lower end section 611 of the protruding actuation shaft 61.

The upper end section 610 of the actuation shaft 61 can move upward from the second member 42 of the second arm 40 along the third pivot shaft J3. As shown in FIG. 2, the upper end section 610 of the actuation shaft 61 is positioned inside the cover member 62 so as not to move upward beyond the cover member 62. That is, the upward movement limit of the upper end section 610 is lower than the first arm 20. That is, the length l1 of the actuation shaft 61 along an axial direction of the third pivot axis J3 from the second member 42 of the second arm 40 to the upper end section 610 is shorter than the distance D along the axial direction of the third pivot axis J3 between the first arm 20 and the second member 42 of the second arm 40. At this time, the upper end section 610 of the actuation shaft 61 and the first arm 20 are separated by a predetermined distance d1 along the axial direction of the third pivot axis J3. Thus, even when the actuation shaft 61 is most raised, the second arm 40 can pass below the first arm 20 without the actuation shaft 61 interfering with the first arm 20. That is, the second arm 40 can rotate 360° with respect to the first arm 20 regardless of the position of the actuation shaft 61 in a vertical direction. The length l2 of the cover member 62 along the axial direction of the third pivot axis J3 from the second member 42 of the second arm 40 to an upper end section, which is an end section of the cover member 62 to a first arm 20 side, is longer than the length l1 described above, but shorter than the distance D as in the length l1 described above. That is, the upper end section of the cover member 62 and the first arm 20 are separated by a predetermined distance d2 along the axial direction of the third pivot axis J3. In this case as well as described above, without the cover member 62 interferes with the first arm 20, the second arm 40 can pass below the first arm 20. The distance D between the second member 42 of the second arm 40 and the first arm 20 along the axial direction of the third pivot axis J3 is the distance between the second member 42 of the second arm 40 and the first arm 20 on an axial line of the third pivot axis J3, and the distance between the second member 42 of the second arm 40 and the first arm 20 other than on the axial line of the third pivot axis J3 may be shorter than the lengths 11 and 12 described above. At least a part of the first member 41 and the first arm 20 may be integrated. In this case, the second joint section 49 is arranged between the first member 41 integrated with the first arm 20 and the second member 42 of the second arm 40, or between a part of the first member 41 integrated with the first arm 20 and the remaining part of the first member 41 of the second arm 40.

As shown in FIG. 2, the drive section 65 includes a shaft raising/lowering mechanism 66 for raising and lowering the actuation shaft 61, and a shaft pivot mechanism 67 for pivoting the actuation shaft 61.

The shaft raising/lowering mechanism 66 includes a shaft raising/lowering motor 661, a lead screw mechanism 662, and a belt 663. The lead screw mechanism 662 is constituted by a ball screw including a screw groove (not shown) formed on an outer peripheral surface of the actuation shaft 61 and a female screw block 6621 pivotably supported on an upper section of the second member 42. In such a shaft raising/lowering mechanism 66, the driving force of the shaft raising/lowering motor 661 is transmitted to the female screw block 6621 via the belt 663, whereby the female screw block 6621 is pivoted to raise and lower the actuation shaft 61 in the upper-lower direction (vertical direction).

The shaft pivot mechanism 67 includes a shaft pivot motor 671, a spline mechanism 672, and a belt 673. The spline mechanism 672 is constituted by a ball spline including a spline groove (not shown) formed on an outer peripheral surface of the actuation shaft 61 and a boss block 6721 pivotably supported on an lower section of the second member 42. The spline mechanism 672 supports the actuation shaft 61 so as to be slidable in the vertical direction. In such a shaft pivot mechanism 67, the driving force of the shaft pivot motor 671 is transmitted to the boss block 6721 via the belt 673, and the actuation shaft 61 is pivoted by pivoting the boss block 6721.

The first motor 31, the second motor 51, the shaft raising/lowering motor 661, and the shaft pivot motor 671 each includes an encoder. As shown in FIG. 3, the first motor 31, the second motor 51, the shaft raising/lowering motor 661, and the shaft pivot motor 671 are electrically connected to the control device 7 via, for example, wiring (not shown).

Next, the control device 7 will be described.

As shown in FIG. 1, the control device 7 is installed at a position away from the robot 1 in the present embodiment. However, the control device 7 is not limited to this configuration and may be built into the base section 11. The control device 7 has a function of controlling the driving of the robot 1, and is electrically connected to each section of the robot 1 described above.

As shown in FIG. 3, the control device 7 includes a control section 71, a storage section 72, and a communication section 73. These sections are communicably connected to each other via, for example, a bus.

The control section 71 is composed of, for example, at least one central processing unit (CPU), and reads out and executes various programs such as an operation program stored in the storage section 72. Signals generated by the control section 71 are transmitted to each section of the robot 1 via the communication section 73, and signals from each section of the robot 1 are received by the control section 71 via the communication section 73. By this, the robot arm 10 can execute a predetermined operation under a predetermined condition.

The control section 71 includes a position command generation section, a motor control section, and a plurality of motor drivers. The motor control section performs noise processes, coordinate conversion processes, and the like on an output value of an inertial sensor 81 (to be described later), and calculates the magnitude and direction of vibration detected by the inertial sensor 81. Then, a feedback value that cancels the vibration component is generated, and each motor of the robot arm 10 is controlled using the feedback value.

Specifically, the position command generation section calculates a target position of the actuation shaft 61 based on the content of the process performed by the robot 1, and generates a trajectory for moving the actuation shaft 61 to the calculated target position. The position command generation section calculates a pivot angle of each motor 31, 51, 661, and 671 for each predetermined control period so that the actuation shaft 61 moves along the generated trajectory, and outputs a target pivot angle, which is a result of the calculation, to the motor control section as each position command.

The motor control section receives position commands for motors 31, 51, 661, and 671, and detection signals from each encoder, performs feedback control so that the pivot angles of the motors 31, 51, 661, and 671 match the target pivot angles, and outputs a control signal to each motor driver. A motor control section receives input of a detection signal from the inertial sensor 81 when driving at least a part of the motor. The motor control section that receives the detection signal from the inertial sensor 81 calculates a feedback value using a detection signal from at least a part of the encoders and a detection signal from the inertial sensor 81 to cancel a vibration component, and performs the above-described feedback control.

A motor driver is provided in each of the motors 31, 51, 661, and 671, and operates based on a control signal from the motor control section. Each motor driver includes an inverter circuit including a switching element, converts direct current into alternating current by pulse width modulation (PWM) control, supplies the alternating current to each motor 31, 51, 661, and 671, and drives each motor 31, 51, 661, and 671.

In the present embodiment, for example, when the driving of the first motor 31 is described, in addition to a position command of the first motor 31, detection signals are input to the motor control section from the encoder of the first motor 31, the encoder of the second motor 51, and the inertial sensor 81, and a feedback value is calculated using these detection signals. The motor control section performs feedback control using a feedback value so that a pivot angle of the first motor 31 calculated from a detection signal of the encoder of the first motor 31 matches a target pivot angle of the first motor 31, and outputs a control signal to the motor driver of the first motor 31. The motor driver of the first motor 31 supplies an alternating current to the first motor 31 based on a control signal from the motor control section, to drive the first motor 31. By driving each motor of the robot arm 10 using such a feedback value, it is possible to perform vibration control on the first arm 20, the second arm 40, and the work head 60 based on a detection value of a vibration detection section 8, as will be described later. Only one motor control section is provided in the control section 71, but not limited to this, a plurality of motor control sections may be provided. When a plurality of motor control sections are provided, a motor control section corresponding to each of the motors 31, 51, 661, and 671 may be provided. A configuration may be adopted in which a detection signal of the encoder of the second motor 51 is not input to the motor control section when the first motor 31 is driven. In this case, the motor control section calculates a feedback value using detection signals from the encoder of the first motor 31 and the inertial sensor 81.

However, the present disclosure is not limited to this configuration, and the control section 71 may be configured to perform vibration control on one or a combination of two or more of the first arm 20, the second arm 40, and the work head 60 based on a detection value of the vibration detection section 8.

For example, the control section 71 may be configured to perform vibration control on only the first arm 20 based on a detection value of the vibration detection section 8. That is, a feedback value may be used to drive only the first motor 31.

The control section 71 may be configured to perform vibration control on only the second arm 40 based on a detection value of the vibration detection section 8. That is, a feedback value may be used to drive only the second motor 51.

The control section 71 may be configured to perform vibration control on only the work head 60 based on a detection value of the vibration detection section 8. That is, a feedback value may be used to drive only the shaft raising/lowering motor 661 and the shaft pivot motor 671 of the drive section 65. In a case where vibration control is performed on the work head 60, a feedback value may be used to drive only one of the shaft raising/lowering motor 661 and the shaft pivot motor 671. This also applies to the following description.

The control section 71 may be configured to perform vibration control only on the first arm 20 and the second arm 40 based on a detection value of the vibration detection section 8. That is, a feedback value may be used to drive only the first motor 31 and the second motor 51.

The control section 71 may be configured to perform vibration control only on the first arm 20 and the work head 60 based on a detection value of the vibration detection section 8. That is, a feedback value may be used to drive only the first motor 31, the shaft raising/lowering motor 661, and the shaft pivot motor 671.

The control section 71 may be configured to perform vibration control only on the second arm 40 and the work head 60 based on a detection value of the vibration detection section 8. That is, a feedback value may be used to drive only the second motor 51, the shaft raising/lowering motor 661, and the shaft pivot motor 671.

By performing vibration control as described above in the ceiling mounted type robot 1, it is possible to improve the positional accuracy of work and to perform work with high accuracy. In particular, as will be described later, since it is possible to accurately detect vibration of the base section 11 in the robot system 100, it is possible to perform work with higher accuracy.

The storage section 72 stores various programs and the like executed by the control section 71. Examples of the storage section 72 include a volatile memory such as random access memory (RAM), a nonvolatile memory such as read only memory (ROM), and a detachable external storage device.

The communication section 73 transmits and receives signals between each section of the robot 1 and the control device 7 using an external interface such as a wired local area network (LAN) or a wireless LAN. In this case, communication may be performed via a server (not shown), or via a network such as the Internet.

Next, the vibration detection section 8 will be described.

The vibration detection section 8 shown in FIG. 1 is installed on the base section 11 and detects vibration. With respect to vibration of the base section 11, each section of the robot arm 10 vibrates in accordance with the driving of the robot arm 10, the vibration is transmitted to the top plate 91, and the top plate 91 may largely vibrate. The vibration of the top plate 91 may adversely affect the accuracy of work. For example, due to the pivot of the first arm 20 about the first pivot axis J1, the pivot of the second arm 40 about the second pivot axis J2, or the pivot of the actuation shaft 61 about the third pivot axis J3, the top plate 91 receives a force from the robot arm 10 in a direction orthogonal to the first pivot axis J1, that is, in the present embodiment, in the horizontal direction, and vibrates. Due to the movement of the actuation shaft 61 along the third pivot axis J3, or the gripping or releasing of a workpiece by the hand 90, at least a part of the top plate 91 receives a force from the robot arm 10 in an axial direction of the first pivot axis J1, that is, in the vertical direction in the present embodiment, and vibrates. In particular, vibration of the top plate 91 of the frame-shaped platform 9 tends not to attenuate. Therefore, vibration of the top plate 91 then vibrates the robot arm 10 through the base section 11 installed on the top plate 91, as a result, the position of the actuation shaft 61 is shifted from a target position. Therefore, when the ceiling mounted type SCARA robot suspended from a ceiling is driven to perform work, it is desirable to perform vibration control, that is, drive control according to contents, characteristics, degree, and the like of vibration in at least some of the motors, for example, so that the actuation shaft 61 is at a target position. In order to perform vibration control as described above, it is necessary to accurately detect vibration of the top plate 91. Therefore, in the present disclosure, the vibration detection section 8 is installed on the base section 11 fixed to the top plate 91 of the platform 9. By this, vibration of the top plate 91 can be more directly detected, so that the detection accuracy of the vibration can be enhanced. As a result, for example, the vibration control as described above can be appropriately performed, and the work accuracy can be improved. Work of installing or removing the vibration detection section 8 may take time and effort for a worker, and in particular, when the top plate 91 is at a high position, the difficulty level of work increases. In the present disclosure, since the vibration detection section 8 is installed on the base section 11, work of installing or removing the vibration detection section 8 can be omitted as compared with the case where the robot arm 10 and the vibration detection section 8 are separately installed on or removed from the top plate 91.

In particular with the robot arm 10, the second arm 40 can pivot 360° with respect to the first arm 20. In such a configuration, when the vibration detection section 8 is provided at a tip end section of the robot arm 10 as in the related art, a complicated calculation is required to specify a vibration direction. On the other hand, according to the configuration of the present disclosure, a vibration direction can be easily specified, which is advantageous as compared with the related art.

In the shown ceiling mounted robot, as compared with a SCARA robot of the type installed on the ground (not shown), the distance between an installation surface of the robot (in the present embodiment, the lower surface 912)

and the ground (not shown) is large. Therefore, the influence of vibration to which a tip end of the robot arm 10 is subjected is large. In combination with these, according to the configuration of the present disclosure, the advantage of performing accurate vibration detection is remarkable.

As shown in FIG. 4, in the present embodiment, the vibration detection section 8 includes the inertial sensor 81 that detects the inertial force of the base section 11. In the present embodiment, the inertial sensor 81 includes a total of six types: acceleration in a direction along an x-axis, acceleration in a direction along a y-axis, acceleration in a direction along a z-axis, the angular velocity about the x-axis, the angular velocity about the y-axis and the angular velocity about the z-axis. That is, the inertial sensor 81 is an inertial measurement unit (IMU) that detects the acceleration in directions of three axes orthogonal to each other and the angular velocity about the axial directions of the three axes.

However, the configuration is not limited thereto, and the inertial sensor 81 may be configured to detect only the acceleration in a direction along the x-axis, the acceleration in a direction along the y-axis, and the acceleration in a direction along the z-axis, or may be configured to detect only the angular velocity about the x-axis, the angular velocity about the y-axis, and the angular velocity about the z-axis.

In addition to these, the inertial sensor 81 may be configured to detect the angular acceleration about the x-axis, the angular acceleration about the y-axis, and the angular acceleration about the z-axis, or may be configured to detect only angular acceleration about the x-axis, angular acceleration about the y-axis, and angular acceleration about the z-axis.

As shown in FIG. 3, the inertial sensor 81 is electrically connected to the control device 7, and a detection value detected by the inertial sensor 81 is transmitted to the control device 7 as an electrical signal and used for the above-described vibration control.

The vibration detection section 8 is not limited to the above-described configuration and may be, for example, a contact type or non-contact type vibration sensor. As the contact-type vibration sensor, a pressure-sensitive sensor or the like can be used. As the non-contact type vibration sensor, an electrodynamic type, a servo type, a strain gauge type, an eddy current type, a capacitance type, an ultrasonic type, an optical type sensor, or the like can be used.

A display, a memory, and the like may be mounted on the vibration detection section 8. The vibration detection section 8 may be configured to wirelessly transmit a detection value to an external device.

The inertial sensor 81 is s installed in the flange section 111. By this, since the inertial sensor 81 is arranged on the flange section 111 directly fixed to the top plate 91, it is possible to more directly detect vibration of the base section 11 received from the top plate 91.

As shown in FIG. 4, the base section 11 includes a recess section 114 which opens to a lower surface 113 side of the flange section 111. The recess section 114 includes a bottom surface 115 and an inner side surface 116. The inertial sensor 81 is provided in the recess section 114. By this, it is possible to sufficiently detect vibration of the base section 11 while protecting the inertial sensor 81. The depth of the recess section 114 is sufficient to adequately accommodate the inertial sensor 81. By this, it is possible to more reliably protect the inertial sensor 81.

The inertial sensor 81 is arranged on the bottom surface 115 of the recess section 114. By this, it is possible to efficiently detect vibration of the base section 11 while more reliably protecting the inertial sensor 81. The inertial sensor 81 may be installed on the inner side surface 116.

As shown in FIG. 1, the recess section 114 is arranged so as to be shifted from the first motor 31 when viewed from a first pivot axis J1 direction, that is, the vertical direction. In other words, the recess section 114 and the first motor 31 do not overlap each other when viewed from the vertical direction. For this reason, the first motor 31 and the inertial sensor 81 (the vibration detection section 8) are arranged to be shifted from each other when viewed from the vertical direction. By this, maintenance such as cleaning, inspection, repair, and replacement of the first motor 31 can be easily performed, and maintenance of the inertial sensor 81 can be easily performed.

The first motor 31 and the inertial sensor 81 may partially overlap each other when viewed from the vertical direction.

The recess section 114 is arranged so as to be shifted from the first joint section 29 when viewed from the first pivot axis J1 direction, that is, the vertical direction. In other words, the recess section 114 and the first joint section 29 do not overlap each other when viewed from the vertical direction. For this reason, the first joint section 29 and the inertial sensor 81 are arranged shifted from each other when viewed from the vertical direction. By this, it is possible to easily perform maintenance of the first joint section 29 and to easily perform maintenance of the inertial sensor 81.

The first joint section 29 and the inertial sensor 81 may partially overlap each other when viewed from the vertical direction.

In the present embodiment, in the basic posture of the robot 1 shown in FIG. 1, the inertial sensor 81 (the vibration detection section 8) is arranged to be shifted from the second motor 51, which is the second drive source, when viewed from the vertical direction, and is further arranged to be shifted from the second joint section 49.

Unlike the shown configuration, the recess section 114 may be formed so as to open on an upper surface or a side surface of the flange section 111, or it may be formed as a through hole penetrating the flange section 111 in a thickness direction. Further, the recess section 114 may be provided in a portion of the base section 11 other than the flange section 111, for example, in the main body section 110.

The inertial sensor 81 (the vibration detection section 8) may be installed in a central section of the base section 11 when viewed from the vertical direction. Since the central section of the base section 11 is a section that is relatively easily vibrated, in particular, is easily vibrated in the vertical direction, it is possible to increase the detection accuracy of vibration.

As described above, the robot 1 includes the base section 11 that is installed on the lower surface 912, which is the installation surface of the top plate 91; the first arm 20 that is connected to the base section 11 so as to be pivotable about the first pivot axis J1 with respect to the base section 11; the second arm 40 that is connected to the first arm 20 so as to be pivotable about the second pivot axis J2 parallel to the first pivot axis J1 with respect to the first arm 20; the actuation shaft 61 as the shaft that is connected to the second arm 40 so as to be pivotable about the third pivot axis J3 parallel to the first pivot axis J1 with respect to the second arm 40 and so as to be movable along an axial direction of the third pivot axis J3, and that includes the upper end section 610, which is an end section on a first arm 20 side; and the vibration detection section 8 that is provided on the base section 11, wherein the length 11 of the actuation shaft 61 from the second arm 40 to the upper end section 610 of the actuation shaft 61 is shorter than the distance D along the axial direction of the third pivot axis J3 between the second arm 40 and the first arm 20. By this, the vibration detection section 8 can more directly detect vibration of the top plate 91, so that the detection accuracy of vibration can be improved. As a result, for example, vibration control can be more appropriately performed, and the work accuracy can be improved.

As described above, the base section 11 includes the flange section 111 that is fixed to the lower surface 912, which is the installation surface of the top plate 91, and the vibration detection section 8 is provided on the flange section 111. By this, vibration of the base section 11 can be detected more directly, which contributes to the improvement of the detection accuracy of vibration.

The present disclosure is not limited to the configuration shown in the drawings, and the vibration detection section 8 may be provided on another portion of the flange section 111, for example, on a side surface of the flange section 111, or may be provided on a portion other than the flange section 111, for example, on the main body section 110.

The base section 11 has a recess section 114 that opens to the first arm 20 side, and the vibration detection section 8 is installed in the recess section 114. By this, it is possible to detect vibration of the base section 11 while protecting the inertial sensor 81.

A first motor 31 as the first drive source that is provided on the base section 11 and that drives the first arm 20 to pivot, and the first motor 31 and the vibration detection section 8 are arranged so as to be shifted when viewed from the first pivot axis J1 direction. By this, it is possible to easily perform maintenance of the first motor 31, and it is possible to easily perform maintenance of the inertial sensor 81.

The first joint section 29 as the connection section for connecting the base section 11 and the first arm 20 is provided, and the first joint section 29 and the vibration detection section 8 are arranged so as to be shifted when viewed from the first pivot axis J1 direction. By this, it is possible to easily perform maintenance of the first joint section 29 and to easily perform maintenance of the inertial sensor 81.

As described above, the robot system 100 includes the base section 11 that is installed on the lower surface 912, which is the installation surface of the top plate 91; the first arm 20 that is connected to the base section 11 so as to be pivotable about the first pivot axis J1 with respect to the base section 11; the second arm 40 that is connected to the first arm 20 so as to be pivotable about the second pivot axis J2 parallel to the first pivot axis J1 with respect to the first arm 20; the actuation shaft 61 as the shaft that is connected to the second arm 40 so as to be pivotable about the third pivot axis J3 parallel to the first pivot axis J1 with respect to the second arm 40 and so as to be movable along an axial direction of the third pivot axis J3, and that includes the upper end section 610, which is an end section on a first arm 20 side; the vibration detection section 8 that is provided on the base section 11; and the control section 71 that controls driving of at least one of the first arm 20, the second arm 40, and the actuation shaft 61 based on a detection value of the vibration detection section 8, wherein the length 11 of the actuation shaft 61 from the second arm 40 to the upper end section 610 of the actuation shaft 61 is shorter than the distance D along the axial direction of the third pivot axis J3 between the second arm 40 and the first arm 20. By performing such control, highly accurate work can be performed. In particular, since vibration of the base section 11 can be more accurately detected in the robot system 100, it is possible to perform work with higher accuracy.

The control section 71 performs vibration control on at least one of the first arm 20, the second arm 40, and the actuation shaft 61 as a shaft based on a detection value of the vibration detection section 8. By this, it is possible to perform work with higher accuracy.

As the control performed by the control section 71 is not limited to vibration control, it may be the first to third control patterns exemplified below. Note that control may be performed by arbitrarily combining the first to third control patterns.

First Control Pattern

When the amplitude of the vibration calculated based on a detection value of the vibration detection section 8 exceeds a first threshold, the driving of the robot arm 10 is stopped. By this, the accuracy of work can be improved, and the safety can be improved.

Second Control Pattern

When the amplitude of the vibration calculated based on a detection value of the vibration detection section 8 exceeds a second threshold, the robot arm 10 is decelerated. By this, the accuracy of work can be improved, and the safety can be improved. The degree of deceleration may be predetermined, and may be determined according to the magnitude of the amplitude.

Third Control Pattern

When the amplitude of the vibration calculated based on a detection value of the vibration detection section 8 exceeds the second threshold, the operation parameter set in the robot arm 10 is changed. By this, the accuracy of work can be improved, and the safety can be improved. Examples of the operation parameter include a mass coefficient, a viscosity coefficient, an elasticity coefficient, a target position, and the like.

Second Embodiment

Figure 5:
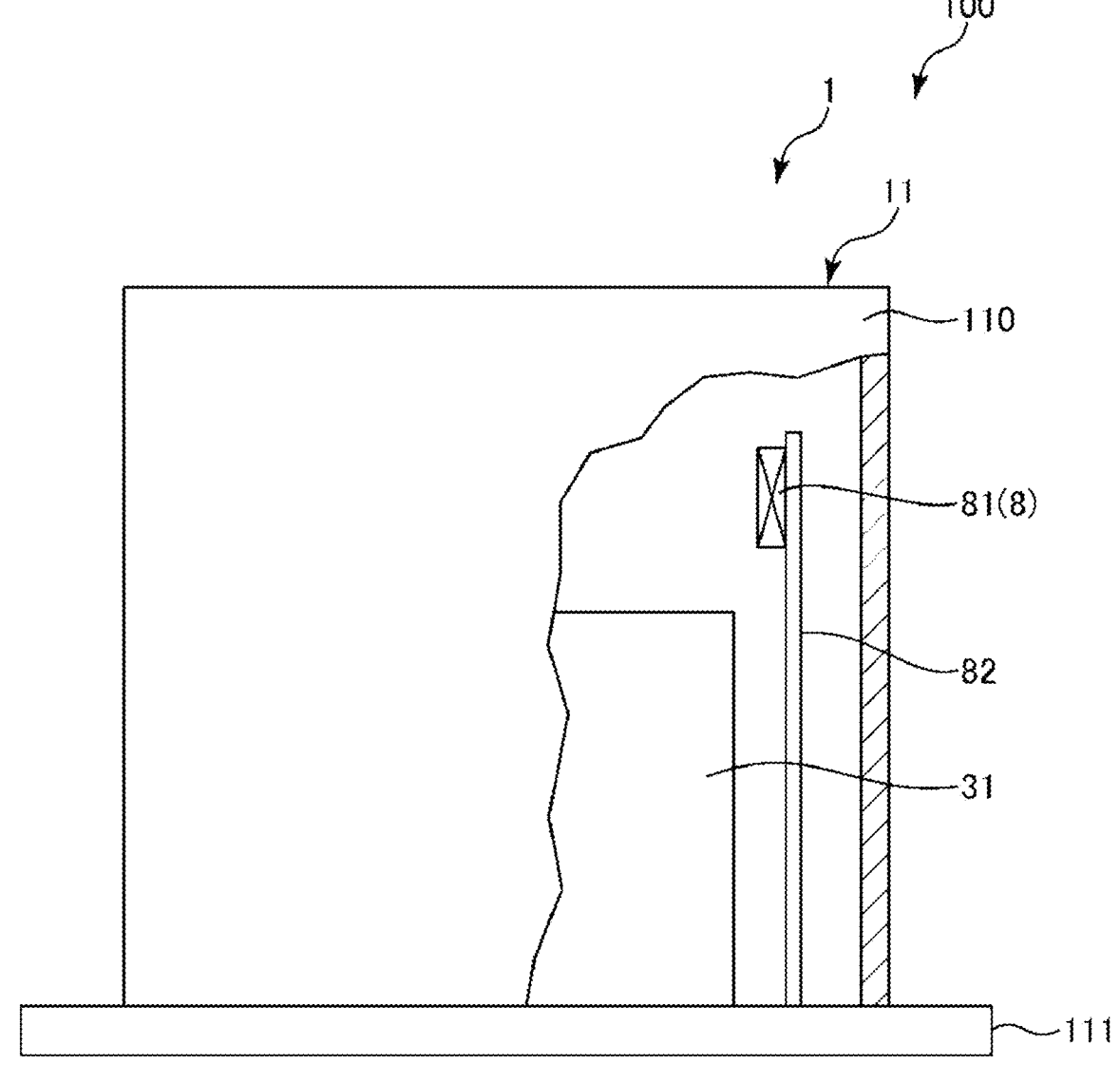
FIG. 5 is a partial cross-sectional view of a base section and a vibration detection section included in a robot and a robot system according to a second embodiment of the present disclosure.

FIG. 5 is a partial cross-sectional view of a base section and a vibration detection section included in a robot and a robot system according to a second embodiment of the present disclosure.

Hereinafter, the second embodiment of the robot system according to the disclosure will be described with reference to FIG. 5, but hereinafter, differences from the first embodiment will be mainly described, and the description of the same matters will be omitted.

As shown in FIG. 5, the robot 1 includes a vibration amplification member 82 that supports the inertial sensor 81 of the vibration detection section 8. The vibration amplification member 82 has a function of amplifying vibration of the base section 11 and transmitting the amplified vibration to the inertial sensor 81. The vibration amplification member 82 is an elongated member standing upright from a bottom section in the main body section 110 of the base section 11. Specifically, the robot 1 includes the narrow plate-like vibration amplification member 82 erected on an upper surface of the flange section 111 in the main body section 110, and the vibration detection section 8 (the inertial sensor 81) is installed at an upper end section of the vibration amplification member 82. The vibration amplification member 82 is made of, for example, a metal material such as stainless steel or aluminum, or a hard resin material. This makes it possible to appropriately and sufficiently amplify vibration.

The configuration of the vibration amplification member 82 is not limited to the above, and its shape may be, for example, a rod shape, a frame shape, or another shape. The vibration amplification member 82 may be composed of a plurality of elongated members. The vibration amplification member 82 may be installed on a portion other than a bottom section of the base section 11, for example, a side section, a ceiling section, or the like of the main body section 110.

As described above, the robot 1 includes the vibration amplification member 82 that is arranged in the base section 11 and that supports the vibration detection section 8. By this, vibration of the base section 11 can be amplified, and the vibration can be detected with higher accuracy.

The vibration amplification member 82 is longer than the first motor 31 in the vertical direction. That is, the vibration amplification member 82 supports the vibration detection section 8 at a position higher than (above) the first motor 31. By this, vibration of the base section 11 can be amplified more effectively, and the vibration can be detected with higher accuracy.

As described above, the robot 1 includes the first motor 31 as the first drive source that is provided on the base section 11 and that drives the first arm 20 to pivot, and the vibration amplification member 82 supports the vibration detection section 8 at a position higher than the first motor 31. By this, vibration of the base section 11 can be amplified more effectively, and the vibration can be detected with higher accuracy.

In each of the above-described embodiments, an installation surface of the robot 1 is on the top plate 91 positioned in an upper section of the platform 9, but the installation surface of the robot 1 is not limited to this, for example, it may be on a ceiling of a workroom, beams installed in a ceiling or near the ceiling, columns, braces, other structural frameworks, hoist rails, the platform 9, or a wall surface of a workroom.

While the robot and the robot system of the present disclosure have been described with reference to the shown embodiments, the present disclosure is not limited thereto. Each section of the robot system can be replaced with an arbitrary structure that can exhibit the same function. An arbitrary structure may be added to the robot system. The present disclosure may be a combination of at least a part of the features of the first embodiment and at least a part of the features of the second embodiment.

What is claimed is:

1. A horizontal articulated robot installed on an installation surface, the horizontal articulated robot comprising:
   a base section that is installed on the installation surface, the base section being configured with a main body section and a flange section, the flange section extending from the main body section along a direction intersecting a first pivot axis and being fixed to the installation surface;
   a first arm that is connected to the base section so as to be pivotable with respect to the base section about the first pivot axis;
   a second arm that is connected to the first arm so as to be pivotable with respect to the first arm about a second pivot axis parallel to the first pivot axis;
   a shaft that is connected to the second arm so as to be pivotable with respect to the second arm about a third pivot axis parallel to the first pivot axis and so as to be movable along an axial direction of the third pivot axis, and that includes an end section on a first arm side; and
   a vibration detection section that is provided at the base section, wherein
   a length of the shaft from the second arm to the end section of the shaft is shorter than a distance along the axial direction of the third pivot axis between the second arm and the first arm,
   the vibration detection section is disposed inside of the flange section,
   the flange section includes a recess section that opens to the first arm side, and
   the vibration detection section is installed in the recess section.

2. The horizontal articulated robot according to claim 1, further comprising:
   a first drive source that is provided at the base section and that is configured to drive the first arm to pivot, wherein
   the first drive source and the vibration detection section are arranged so as to be shifted from each other when viewed from an axial direction along the first pivot axis.

3. The horizontal articulated robot according to claim 1, further comprising:
   a connection section that connects the base section and the first arm, wherein
   the connection section and the vibration detection section are arranged so as to be shifted from each other when viewed from an axial direction along the first pivot axis.

4. The horizontal articulated robot according to claim 1, wherein
   the vibration detection section is an inertial sensor.

5. A ceiling mounted type horizontal articulated robot installed on an installation surface, the ceiling mounted type horizontal articulated robot comprising:
   a base section that is installed on the installation surface, the base section being configured with a main body section and a flange section, the flange section extending from the main body section along a direction intersecting a first pivot axis and being fixed to the installation surface;
   a first arm that is connected to the base section so as to be pivotable with respect to the base section about the first pivot axis;
   a second arm that is connected to the first arm so as to be pivotable with respect to the first arm about a second pivot axis parallel to the first pivot axis;
   a shaft that is connected to the second arm so as to be pivotable with respect to the second arm about a third pivot axis parallel to the first pivot axis and so as to be movable along an axial direction of the third pivot axis, and that includes an end section on a first arm side; and
   a vibration detection section provided at the base section, wherein
   the vibration detection section is disposed inside of the flange section,
   the flange section includes a recess section that opens to the first arm side, and
   the vibration detection section is installed in the recess section.

6. A horizontal articulated robot system comprising:
   a horizontal articulated robot installed on an installation surface, the horizontal articulated robot including:
      a base section that is installed on the installation surface, the base section being configured with a main body section and a flange section, the flange section extending from the main body section along a direction intersecting a first pivot axis and being fixed to the installation surface;
      a first arm that is connected to the base section so as to be pivotable with respect to the base section about the first pivot axis;

a second arm that is connected to the first arm so as to be pivotable with respect to the first arm about a second pivot axis parallel to the first pivot axis;

a shaft that is connected to the second arm so as to be pivotable with respect to the second arm about a third pivot axis parallel to the first pivot axis and so as to be movable along an axial direction of the third pivot axis, and that includes an end section on a first arm side; and a vibration detection section that is provided at the base section; and a control section configured to control driving of at least one of the first arm, the second arm, and the shaft based on a detection value of the vibration detection section, wherein a length of the shaft from the second arm to the end section of the shaft is shorter than a distance along the axial direction of the third pivot axis between the second arm and the first arm, the vibration detection section is disposed inside of the flange section, the flange section includes a recess section that opens to the first arm side, and the vibration detection section is installed in the recess section.

7. The horizontal articulated robot system according to claim 6, wherein the control section is further configured to perform vibration control on at least one of the first arm, the second arm, and the shaft based on the detection value of the vibration detection section.

\* \* \* \* \*